United States Patent

Sasaki et al.

[11] Patent Number: 5,908,991
[45] Date of Patent: Jun. 1, 1999

[54] KARMAN VORTEX FLOW METER

[75] Inventors: Shu Sasaki; Sakae Kiguchi, both of Tokyo; Toru Hashimoto, Kyoto; Shoji Hashimoto, Kyoto; Hiroshi Tanaka, Kyoto, all of Japan

[73] Assignees: Mitsubishi Denki Kabushiki Kaisha; Mitsubishi Jidosha Kogyo Kabushiki Kaisha, both of Tokyo, Japan

[21] Appl. No.: 08/970,392

[22] Filed: Nov. 14, 1997

Related U.S. Application Data

[62] Division of application No. 08/805,053, Feb. 24, 1997, Pat. No. 5,728,946.

[30] Foreign Application Priority Data

Feb. 28, 1996 [JP] Japan ................................. 8-69045

[51] Int. Cl.$^6$ .................................................. G01F 1/32
[52] U.S. Cl. ................................. 73/861.22; 73/861.24
[58] Field of Search .......................... 73/861.22, 861.24, 73/861.23, 202, 202.5

[56] References Cited

U.S. PATENT DOCUMENTS

| | | | |
|---|---|---|---|
| 3,722,273 | 3/1973 | Yamasaki et al. | 73/861.22 |
| 4,299,121 | 11/1981 | Asayama et al. | 73/861.22 |
| 4,584,883 | 4/1986 | Miyoshi et al. | 73/861.24 |
| 4,683,760 | 8/1987 | Misumi | 73/861.22 |
| 5,467,648 | 11/1995 | Igarashi et al. | 73/202 |
| 5,554,805 | 9/1996 | Bahrton | 73/202 |
| 5,614,681 | 3/1997 | Tada | 73/861.22 |

FOREIGN PATENT DOCUMENTS

| | | |
|---|---|---|
| 57-17864 | 1/1982 | Japan . |
| 57-86013 | 5/1982 | Japan . |

*Primary Examiner*—Harshad Patel
*Attorney, Agent, or Firm*—Sughrue, Mion, Zinn, Macpeak & Seas, PLLC

[57] ABSTRACT

In a Karman vortex flow meter, a first space section is provided between a detection section and an inflow opening, and a second space section is provided between the detection section and an outflow opening. The first space and the second space have cross-sectional areas larger than a cross-sectional area of the detection passage. Accordingly, a disorder of a fluid coming in the inflow opening of the detection passage and pulsation components coming from the outflow opening are reduced by the first and second spaces.

3 Claims, 9 Drawing Sheets

KARMAN VORTEX FLOW METER

This is a divisional of application Ser. No. 08/805,053 filed Feb. 24, 1997 now U.S. Pat. No. 5,728,946.

BACKGROUND OF THE INVENTION

1. Field of the Invention

The present invention relates to a Karman vortex flow meter applicable to internal combustion engines of motor vehicles or the like for measuring flow velocity and flow rate of fluid, and more particularly to a system to detect a Karman vortex through the use of a hot wire or the like.

2. Description of the Related Art

As systems to detect a Karman vortex through the use of a hot wire, there have been known a method of directly detecting the Karman vortex occurring in a fluid through the use of a hot wire and a method of detecting a secondary flow due to alternating Karman vortexes. For example, the former is disclosed in Japanese Patent Laid-Open No. 57-86013 (see FIG. 11), while the latter is been disclosed in Japanese Patent Laid-Open No. 57-17864 (see FIG. 12) or Japanese Utility Model Laid-Open No. 5-84825 (see FIG. 13).

In FIG. 11, a vortex generating pole or column 2 is placed in a duct 1 through which a fluid flows, and hot wires 9a and 9b are symmetrically disposed in a vortex passing region existing on the downstream of the vortex generating pole 2. This structure detects a Karman vortex 7 generated alternately on the downstream of the vortex generating pole 2 by the flows of a fluid indicated by an arrow 10 as the increase and decrease in the heating current fed to the hot wires 9a and 9b, thereby measuring a flow velocity or flow rate on the basis of a period of generation of the Karman vortexes.

On the other hand, in FIG. 12, a hot wire 9 is stretched in a through hole 5 which establishes communication between both side portions of a vortex generating pole 2 located within a duct 1 in which a fluid flows, so that the flow produced in the through hole 5 following the generation of Karman vortexes 7 is converted utilizing the variation in the radiating quantity of the hot wire 9 into an alternating current signal synchronizing with the vortex generation to measure the flow velocity or flow rate on the basis of the frequency or period of this alternating current signal.

Furthermore, in FIG. 13, pressure measuring holes 11 are made in right and left side surfaces of a vortex generating pole 2 fitted in directions perpendicular to the direction of flow in a measurement passage, and these pressure measuring holes 11 are communicated with each other through a detection passage 12. In addition, a thermal flow sensor 13 is situated within the detection passage 12. With this structure, pressure fluctuation occurs due to the Karman vortexes alternately generated in both sides of the vortex generating pole 2, and the flows alternately produced in the right and left directions within the detection passage 12 due to this pressure fluctuation are detected as the resistance variation of the thermal flow sensor 13 caused by its temperature variation, thereby measuring the flow velocity or flow rate.

The prior Karman vortex flow meters produce the following problems coming from their above-mentioned structures. That is, in cases where as shown in FIG. 11 the hot wires are directly placed within the duct in which a fluid flows, the dust included in the fluid accumulates on the hot wires in a long time use, and the accumulated dust can hinder the heat radiation of the hot wires, with the result that the electric output of the hot wires decreases to make difficult the detection of the Karman vortexes before long.

Further, in cases where as shown in FIGS. 12 or 13 the holes are made in the vicinity of two vortex separation points on the side surfaces of the vortex generating pole and the detection passage is formed to set up the communication between the holes, the Karman vortexes alternately arising with respect to the detection passage interfere with each other, so that the generation of the Karman vortexes can come into instability.

Moreover, the flow of a fluid (air) taken in an internal combustion engine involves pulsation due to the opening and closing operations of an air intake valve, a throttle valve and other devices. If measuring the period of the Karman vortexes in the flow with a large amplitude of the pulsation, the measurement becomes unstable owing to the effects of the pulsation, with the result that difficulty is encountered to correctly measure the Karman vortexes.

SUMMARY OF THE INVENTION

Accordingly, the present invention has been developed in order to eliminate the aforesaid problems, and it is an object of the present invention to provide a vortex flow meter which is capable of always making the Karman vortexes stable irrespective of the flow rate without undergoing the influence of the dust in the fluid under measurement and of suppressing the influence of the pulsation in the flow of the fluid under measurement upon a flow velocity detecting section to stably measure the frequency of the Karman vortex.

To this end, according to one aspect of the present invention, there is provided a Karman vortex flow meter provided with a vortex generator in its duct in which a fluid comes and made to detect a period of Karman vortexes generated due to the vortex generator to measure a flow velocity or a flow rate of the fluid, comprising: a detection passage placed along a flowing direction of the fluid within the duct and equipped with an outflow opening made in an end surface of the vortex generator and an inflow opening situated on the upstream side of the outflow opening; and a detection section placed in the detection passage to detect variation of a flow velocity of the fluid within the detection passage which occurs due to a negative pressure of the Karman vortexes, wherein a first space section is provided between the detection section and the inflow opening, the first space having a cross-sectional area larger than a cross-sectional area of the detection passage communicating with the inflow opening and a cross-sectional area of the detection passage accommodating the detection section, and further a second space section is provided between the detection section and the outflow opening, the second space having a cross-sectional area larger than a cross-sectional area of the detection passage communicating with the outflow opening and the cross-sectional area of the detection passage accommodating the detection section.

According to another aspect of the present invention, there is provided a Karman vortex flow meter provided with a vortex generator in its duct in which a fluid comes and made to detect a period of Karman vortexes generated due to the vortex generator to measure a flow velocity or flow rate of the fluid, comprising: a detection passage placed along a flowing direction of the fluid within the duct and equipped with an outflow opening made in an end surface of the vortex generator and an inflow opening situated on the upstream side of the outflow opening; and a detection section placed in the detection passage to detect variation of a flow velocity of the fluid within the detection passage which occurs due to a negative pressure of the Karman vortexes, wherein the inflow opening of the detection passage is disposed on the wall surface of the duct, and a projection protruding from the wall surface of the duct is provided on the upstream side of the inflow opening.

According to a still further aspect of the present invention, there is provided a Karman vortex flow meter provided with a vortex generator in its duct in which a fluid comes and made to detect a period of Karman vortexes generated due to the vortex generator to measure a flow velocity or flow rate of the fluid, the flow meter comprising: a detection passage placed along a flowing direction of the fluid within the duct and equipped with an outflow opening made in an end surface of the vortex generator and an inflow opening situated on the upstream side of the outflow opening; and a detection section placed in the detection passage to detect variation of a flow velocity of the fluid within the detection passage which occurs due to a negative pressure of the Karman vortexes, wherein the outflow opening is placed in the vicinity of a separation point of the Karman vortexes and at a position separated from a boundary layer on the wall surface of the duct, and an opening area of the outflow opening is set to be below twice a passage cross-sectional area of the detection section.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENTS

First Embodiment

First of all, referring to the figures, a description will be made hereinbelow of a structure and an operational principle of a Karman vortex flow meter which constitutes the foundation of the present invention.

Figure 1:
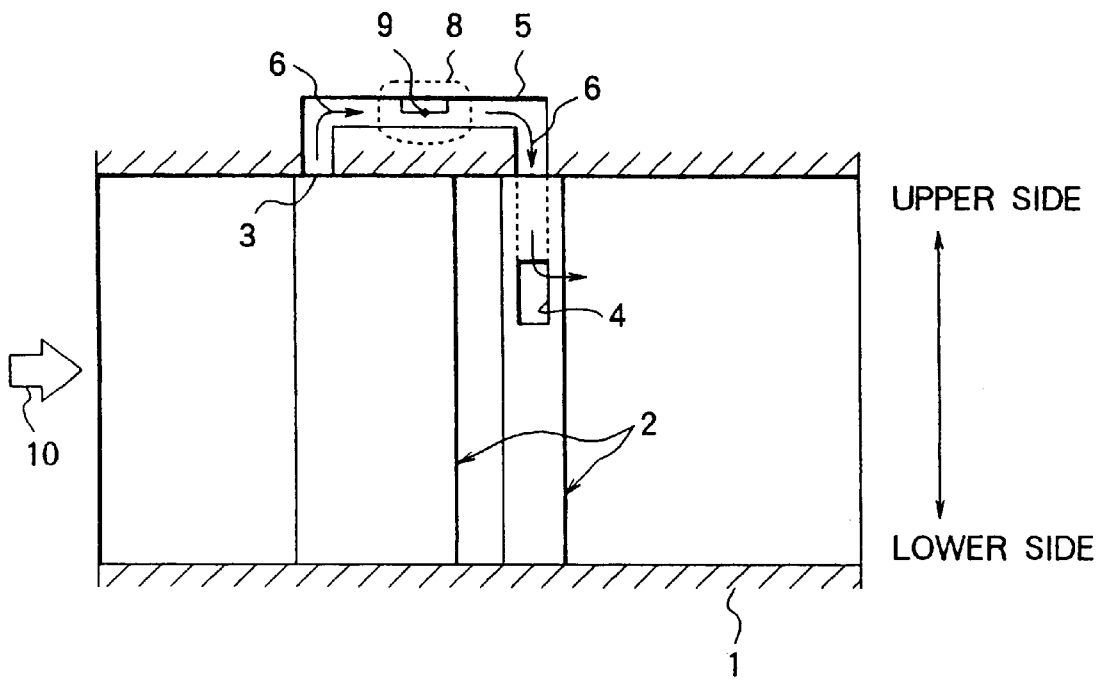
FIG. 1 is a side elevational and cross-sectional view useful for describing the principle of a Karman vortex flow meter.

FIG. 1 is a side elevational view showing a vortex flow meter of this invention. In FIG. 1, a vortex generator 2 is provided within a duct 1 through which a fluid flows, and a detection passage 5 is made along the flowing direction (indicated by an arrow 10) in the duct 1. This detection passage 5 is equipped with an inflow opening 3 provided in a ceiling wall surface of the duct 1 and an outflow opening 4 provided in an end surface of the vortex generator 2. Further, a hot wire 9 is disposed in a detection section 8 within the detection passage 5.

Figure 2:
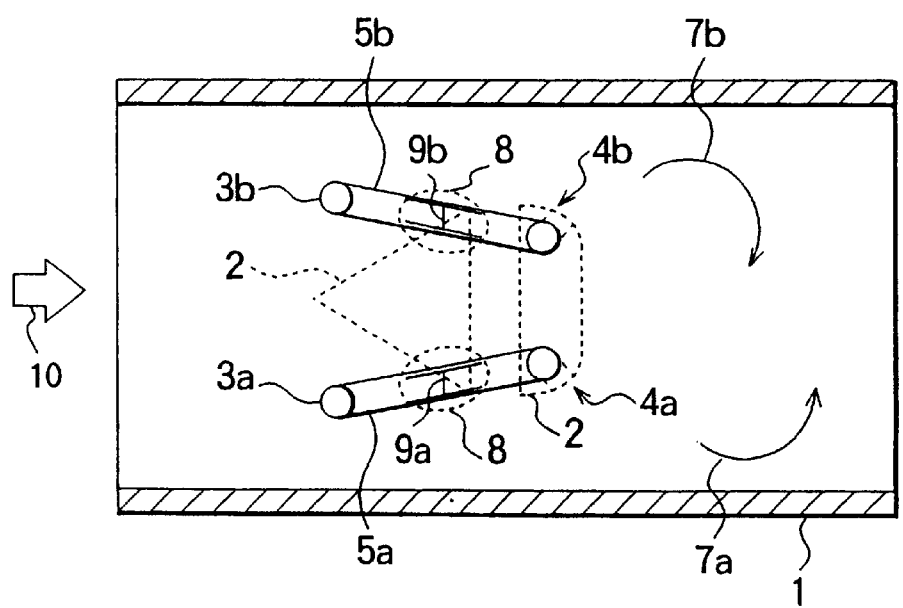
FIG. 2 is a plan view showing the Karman vortex flow meter in FIG. 1.

FIG. 2 is a plan view showing the above mentioned vortex flow meter. In FIG. 2, as the detection passage 5 there are provided two detection passages 5a, 5b having outflow openings (outlets) 4a and 4b, and inflow openings (inlets) 3a and 3b, respectively. The outflow openings 4a and 4b are disposed on both right and left sides with respect to a center line passing through the center of the vortex generator 2 and parallel to the flow in the duct 1, and the inflow openings 3a and 3b are made on the upstream sides of the outflow openings 4a and 4b to the ceiling wall surface of the duct 1. Further, in FIGS. 1 and 2, reference numerals 7a and 7b represent Karman vortexes produced due to the presence of the vortex generator 2, numeral 6 designates the flow of a fluid within the detection passage 5, and numeral 10 denotes an arrow indicative of the flowing direction of the fluid.

In the Karman vortex flow meter thus arranged, when the fluid is introduced into the duct 1 from the direction indicated by the arrow 10, the Karman vortexes 7 alternately develop at the back of the vortex generator 2. Now, let it be assumed that a Karman vortex 7a is produced in the outflow opening 4a side. A negative pressure occurs in the vicinity of the outflow opening 4a, and hence the fluid is drawn into the detection passage 5a from the inflow opening 3a higher in pressure than the outflow opening 4a. That is, a flow of the fluid from the inflow opening 3a side to the outflow opening 4a side generated within the detection passage 5a, and a hot wire 9a detects the flow velocity of this fluid. When a Karman vortex 7b develops in the outflow opening 4b side, a flow of the fluid is generated within the detection passage 5b in similar way, and the other hot wire 9b detects the fluid flow.

Figure 3:
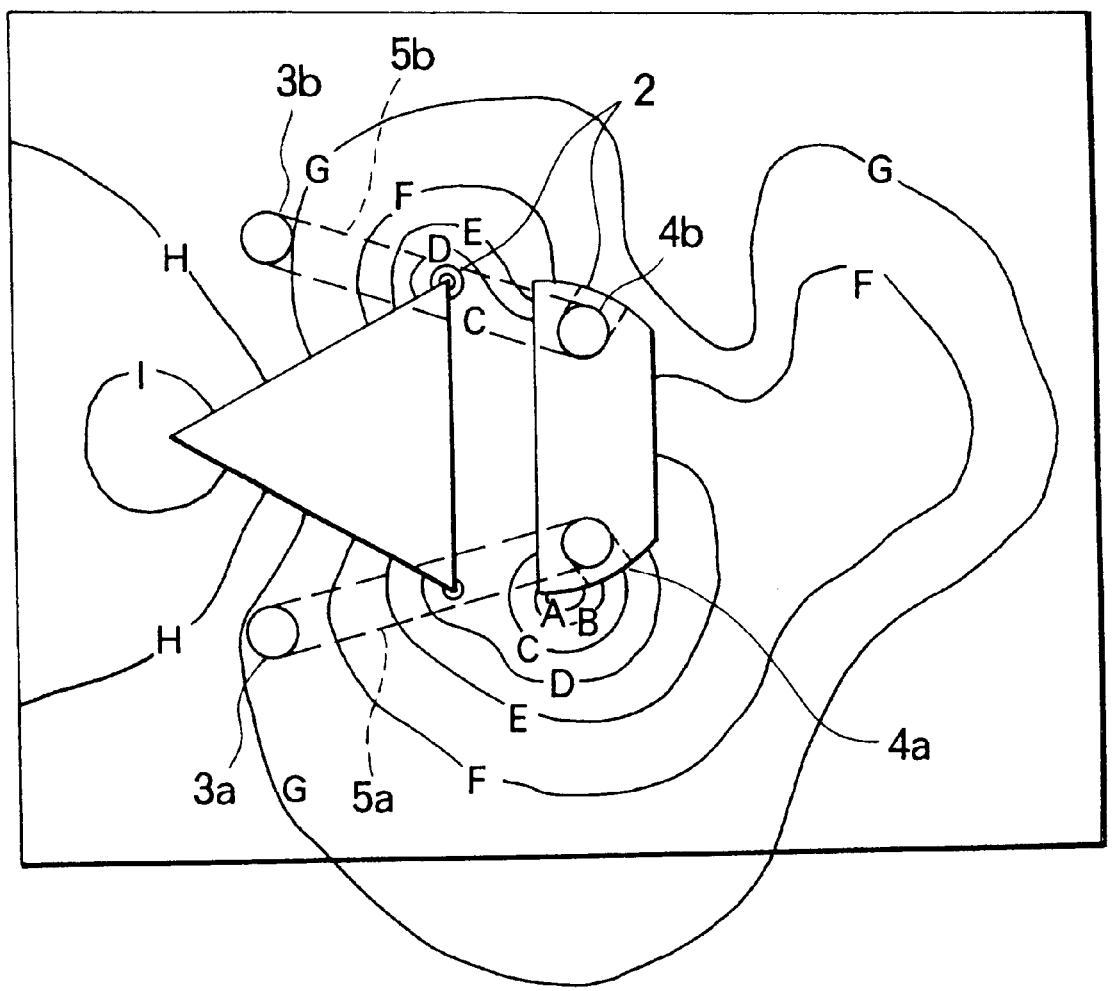
FIG. 3 is an illustration of a pressure distribution at the occurrence of Karman vortexes.

FIG. 3 is an isobaric chart of a portion around the vortex generator 2 taken when the negative pressure in the vicinity of the outflow opening 4a comes to a maximum owing to the Karman vortex 7a on the outflow opening 4a side.

In the chart, characters A to H designates the negative pressure levels, where A denotes the highest negative pressure and the negative pressure decreases in the order of A→H. The flow velocity within the detection passage 5a depends upon the difference between the pressure ($\approx$G) in the inflow opening 3a and the pressure ($\approx$B) in the outflow opening 4a, whereas the flow velocity within the detection passage 5b relies on the difference between the pressure ($\approx$H) in the inflow opening 3b and the pressure ($\approx$G) in the outflow opening 4b. In this case, the sensitivity of the detection of the Karman vortexes 7 corresponds to the difference between the flow velocities detected by the hot wires 9a and 9b. Accordingly, if the detection sensitivity is expressed as a function of pressure, an equation is given as [(G−B)−(H−G)].

Figure 4:
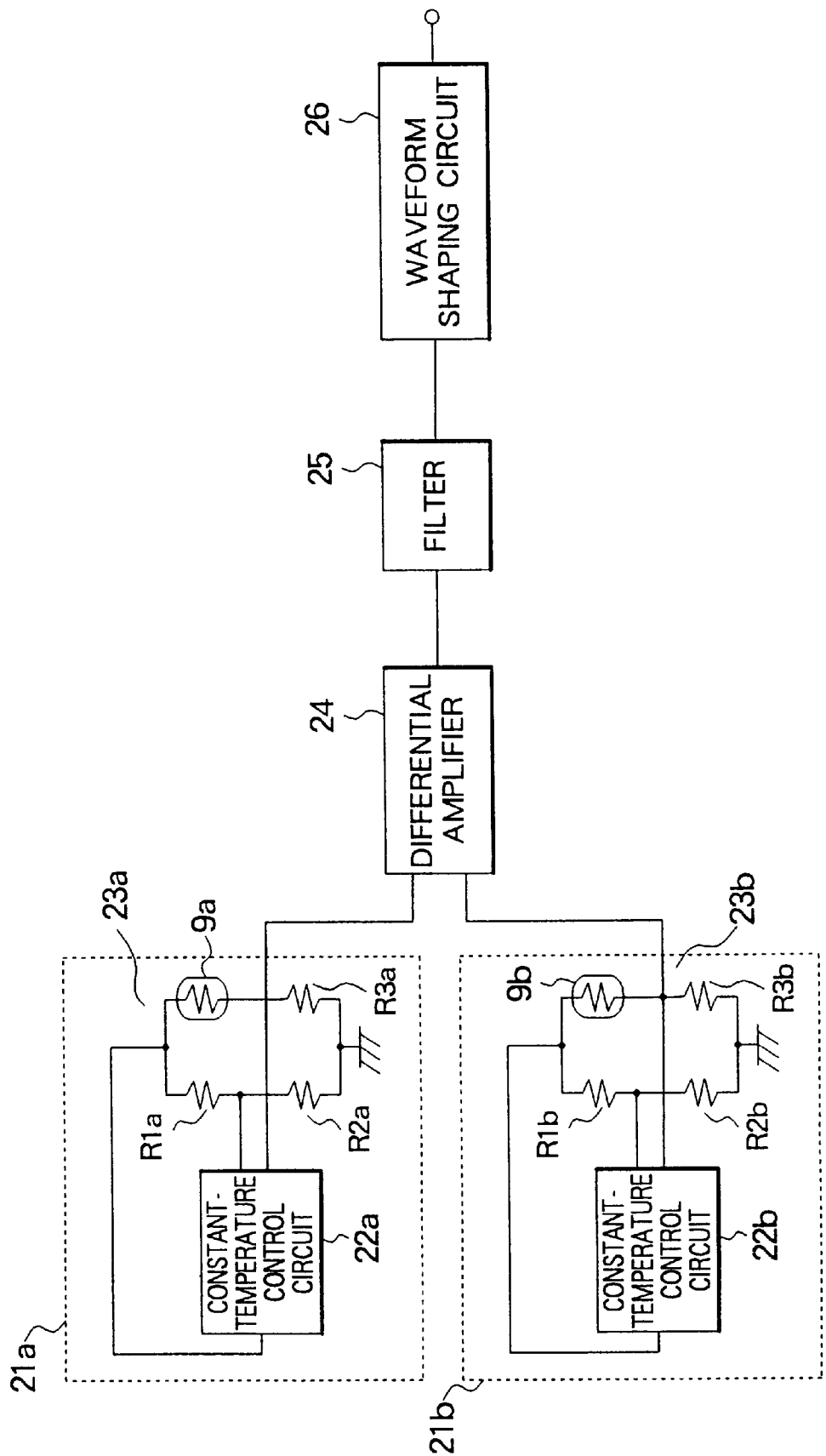
FIG. 4 is a block diagram showing an example of a detection circuit applicable to the Karman vortex flow meter.

FIG. 4 is a block diagram showing an example of a circuit for detecting the flow velocity on the basis of the generation of the Karman vortexes. In the illustration, vortex detection circuits 21a and 21b are composed of bridges 23a and 23b, and constant-temperature control circuits 22a and 22b, respectively. The bridges 23a and 23b are made of hot wires 9a and 9b placed in the detection passages 5 and fixed resistors R1a to R3a and R1b to R3b, respectively, whereas the constant-temperature control circuits 22a and 22b sense unbalanced voltages of the aforesaid bridges 23a and 23b to automatically adjust the voltages to be applied to the bridges 23a and 23b so that the temperatures (resistance values) of the hot wires 9a and 9b are maintained constant. Further, the signals outputted from the vortex detection circuits 21a and 21b are differentially amplified in a differential amplifier 24 and fed to a waveform shaping circuit 26 after passing through a filter 25 for removing direct-current components. In the waveform shaping circuit 26 the signal is converted into a rectangular waveform having a frequency corresponding to the frequency of the Karman vortexes.

In the above-described vortex flow meter, when the outflow openings 4a and 4b of the detection passages 5a and 5b are positioned in the vicinity of the separation point at which the Karman vortexes due to the vortex generator 2 assumes the maximum negative pressure, a larger pressure difference is obtainable between the inflow openings and outflow openings of the detection passages, so that more accurate detection of the variation of the flow due to the Karman vortexes becomes possible. In addition, the position of the separation point of the Karman vortexes can be found through experiments or simulations after determining the configurations of the duct and the vortex generator and others.

Figure 5:
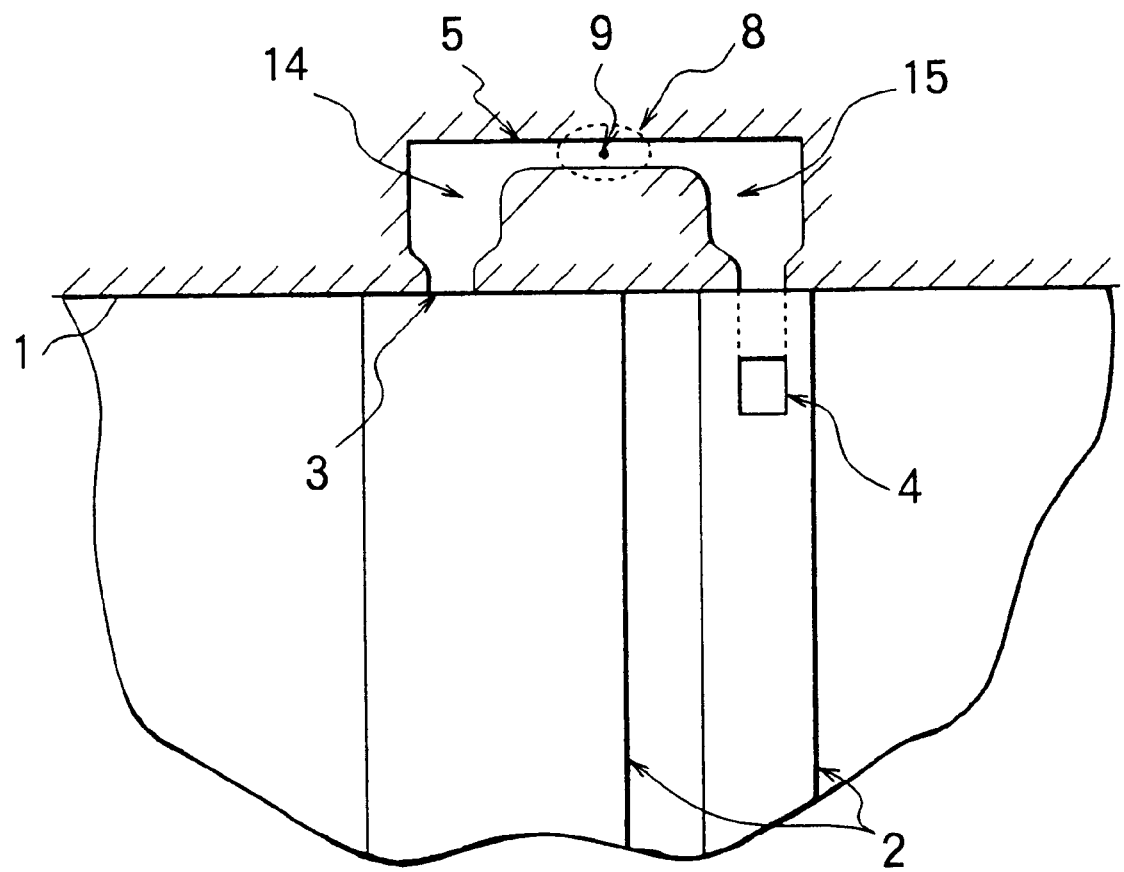
FIG. 5 is a partial side elevational and cross-sectional view showing a Karman vortex flow meter according to a first embodiment of this invention.

FIG. 5 is a partial side elevational and cross-sectional view showing a structure of a Karman vortex flow meter according to a first embodiment of the present invention. This first embodiment basically employs the structure shown in FIGS. 1 and 2, where spaces 14, 15 having larger cross-sectional areas are defined between the detection section 8 including the hot wire 9 within the detection passage 5 and the inflow opening 3 and between the detection section 8 and an outflow opening 4. The space 14 has a passage cross section larger than a cross section of a passage communicating with the inflow opening 3 and a passage cross section of the detection section 8 accommodating the hot wire 9. The space 15 also has a passage cross section larger than a cross section of a passage communicating with the outflow opening 4 and a passage cross section of the hot wire provided detection section 8. In addition, the space 14 formed on the inflow opening 3 side functions to absorb fine fluctuation components of the fluid pressure coming from the duct 1 through the inflow opening 3, while the space 15 installed in the outflow opening 4 side serves to relieve pulsation components of the fluid pressure coming from the outflow opening 4.

Furthermore, tapered configurations or curved surface configurations are provided between the space 14 and inflow opening 3, between the space 15 and the outflow opening 4 and between the spaces 14, 15 and the detection section 8 to produce a smooth cross section variation to rectify the flow within the detection passage 5.

When a fluid is supplied into the Karman vortex flow meter according to the first embodiment, the fluid flows through the detection passage 5 in response to the fluid passing through the duct 1 as mentioned above. The outflow opening 4 of the detection passage 5 is placed in the vicinity of the Karman vortex separation point of a vortex generator 2, and therefore the fluid flowing through the interior of the detection passage 5 regularly varies in flow velocity in accordance with the generation of the Karman vortexes, and the hot wire 9 in the detection section 8 within the detection passage 5 detects this variation.

Although at this time fine irregular disorders due to separations or the like along the wall surfaces take place in the flow of the fluid introduced into the detection passage 5, the space 14 formed between the inflow opening 3 and the detection section 8 absorbs the disorders and the space 15 formed between the outflow opening 4 and the detection section 8 moderates the pulsation components coming from the outflow opening 4.

Moreover, the passage cross section enlarges in the spaces 14 and 15, so that the frictional resistance within the detection passage 5 decreases and the flow velocity becomes faster at the detection section 8. Accordingly, the flow velocity of the fluid greatly varies at the detection section 8 so that the detection signal output from the hot wire 9 increases. In other words, the increase in the signal output of the hot wire 9 produces the effects to withstand the disorders even if experiencing disturbances such as pulsation.

Besides, the tapered or curved surface configurations are formed at the entrances and exits to and from the spaces 14, 15 to create a smooth cross section configuration, thereby rectifying the fluid flowing in the detection passage 5.

Second Embodiment

Figure 6:
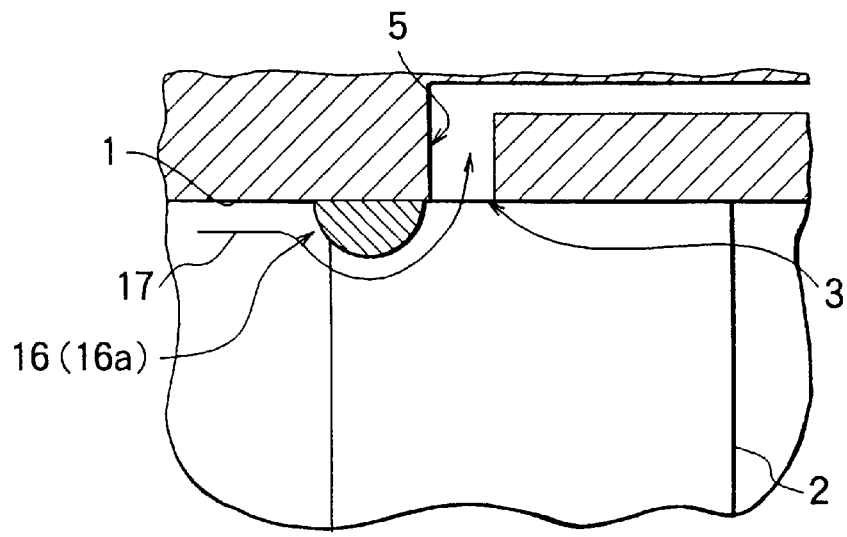
FIG. 6 is a partial side elevational and cross-sectional view showing a Karman vortex flow meter according to a second embodiment of this invention.
Figure 7:
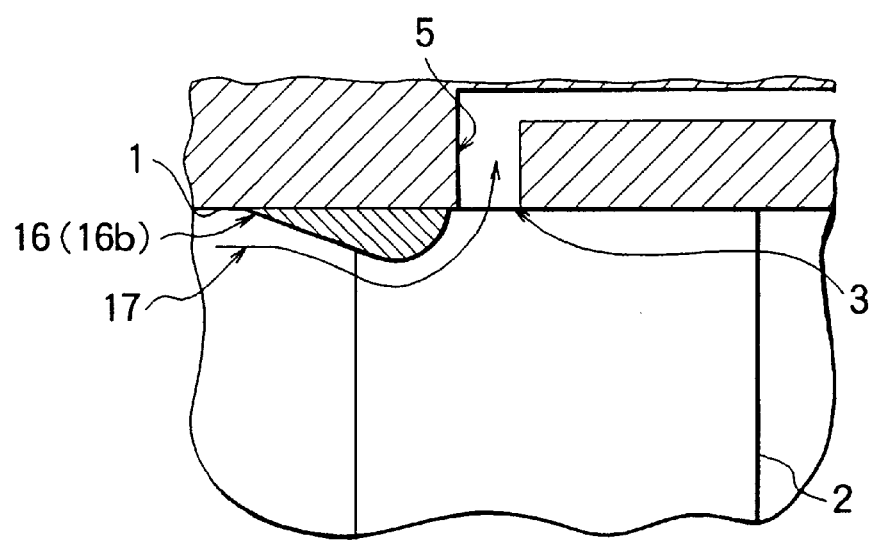
FIG. 7 is a partial side elevational and cross-sectional view showing a Karman vortex flow meter according to the same second embodiment.

FIGS. 6 and 7 show partial side elevational and cross sectional view showing a flow meter according to a second embodiment of this invention, where a projection 16 (16a, 16b) which protrudes from a duct wall surface are provided at the just upstream side of the inflow opening 3 of the detection passage 5 formed in the wall surface of the duct 1. This projection 16 has a configuration to readily draw the fluid within the duct 1. Preferably, as shown in FIG. 6 the projection (16a) is formed to have a semi-circular cross section configuration in the flowing direction of the fluid, or as shown in FIG. 7 the projection (16b) is made to have a circular arc configuration on the flow downstream side and have a tangential plane to the circular arc intersecting a duct wall surface on the upstream side.

According to the second embodiment, since the cross section of the rear side (the downstream side) of the projection 6 has, for example, a circular arc configuration, the fluid flowing toward the inflow opening 3 of the detection passage 5 within the duct 1 is exposed to a force applied in the duct wall surface direction to be easily introduced into the inflow opening 3. That is, the loss occurring at the flow of the fluid into the inflow opening 3 is reduced so that the flow rate of the fluid drawn at the production of the Karman vortexes increases, with the result that the flow velocity at the detection section 8 greatly varies and hence the detection signal output from the hot wire 9 increases.

In addition, the dust having a mass larger than that of the fluid has a larger inertia, and hence the dust goes straight even after running over the projection 16 to be avoidable to enter the inflow opening 3.

Also, as shown in FIG. 7, when the upstream side of the projection 16b is made as a tangent to a circular arc intersecting the duct wall surface, the smooth introduction of the fluid into the detection passage 5 is enhanced to prevent the disorder of the flow of the fluid within the duct 1. In addition, the accumulation of dust on the projection 16 becomes difficult.

Third Embodiment

Figure 8:
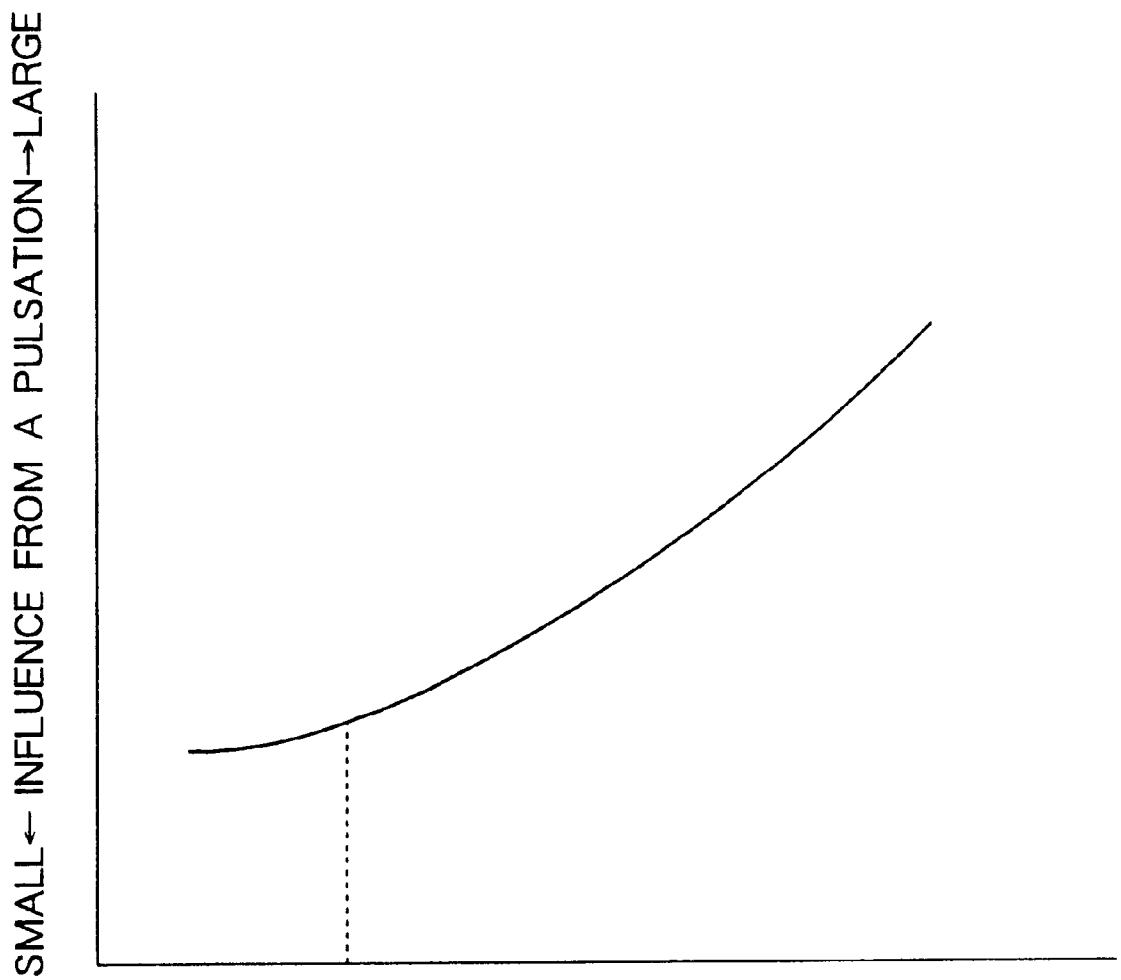
FIG. 8 is a graphic illustration useful for explanation of a third embodiment of this invention.

FIG. 8 is a graph showing the relationship between the opening area of an outflow opening 4 and an influence from the pulsation of a fluid, where the horizontal axis represents a ratio of the opening area of an outflow opening 3 to the passage cross-sectional area of a detection section 8 and the vertical axis designates the degree of the influence from the pulsation of the fluid.

In cases where the outflow opening 4 of the detection passage 5 is located at a position in the vicinity of a separation point of the Karman vortexes and outside of the fluid boundary layer on the duct wall surface, and where the width of the outflow opening 4 in the direction normal to the direction of the flow of the fluid under measurement is changed, the degree of the disturbance of the signal output of a hot wire 9 due to the fluid pressure pulsation reduces as the opening area (i.e., the width) of the outflow opening 4 becomes smaller.

That is, if a generation source of the pressure pulsation in the fluid to be measured is positioned on the downstream side of the Karman vortex flow meter, the measurement is affected by the pulsation from the downstream side. However, it was determined that, as shown in FIG. 8, when the opening area of the outflow opening 4 is set to be less than twice the cross-sectional area of the detection section 8 in which the hot wire 9 exists, the pulsation components coming from the outflow opening 4 can be reduced.

In the above-mentioned structure, when the outflow opening is provided at the separation point of the Karman vortexes, a large pressure difference is attainable within the detection passage so that the Karman vortex detection sensitivity increases. In addition, when the outflow opening is outside of the boundary layer existing along the duct wall surface, the measurement hardly encounters the influence from the stagnation of the flow along the duct wall surface and the flow due to the Karman vortex within the detection passage is not impeded.

Fourth Embodiment

Figure 9:
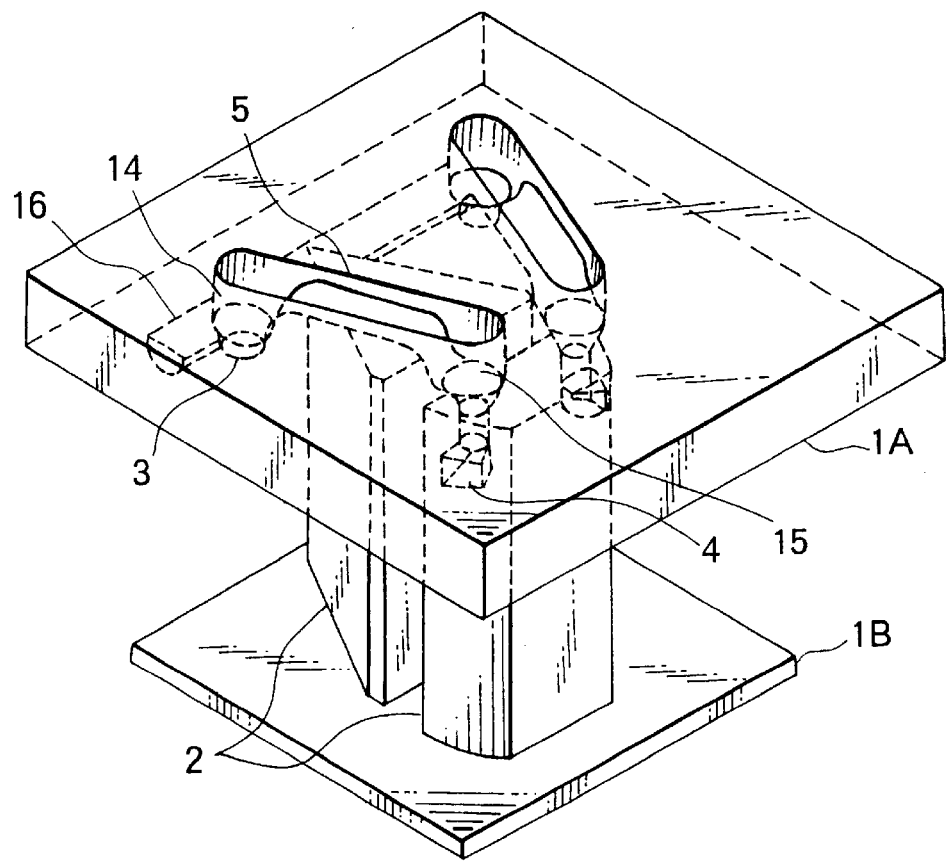
FIG. 9 is a perspective view showing a Karman vortex flow meter according to a fourth embodiment of this invention.

FIG. 9 is a perspective view showing a Karman vortex flow meter according to a fourth embodiment of this invention, showing an integrated section comprising the vortex generator 2, wall portions 1A, 1B of the duct, the detection passages 5, the inflow openings 3, the outflow openings 4, the space sections 14, 15, and the projection 16.

In the illustration, the detection passage 5 is shown with a solid line for clearness. In the illustration, the vortex generator 2 and a ceiling (upper) side section 1A and ground (lower) side section 1B constituting a portion of the duct 1 are integrally molded with a resin, and the duct upper side section 1A has the inflow opening 3 opening toward the fluid passage, the space section 14 communicating with the inflow opening 3, the detection passage 5, and the space section 15 communicating with the outflow opening 4. The detection passage 5 disposed in the duct upper side section 1A has a ditch-like configuration in which its ceiling side is open, and is connected through curved surfaces to the space sections 14, 15. Further, in the inflow side of the detection passage 5, the inflow opening 3 is made right under the space section 14, while the outflow side of the detection passage 5 is coupled through the space section 15 to the outflow opening 4 formed in a side surface of the vortex generator 2. The projection 16 is integrally located in the upstream side of the two inflow openings 3 of the detection passages 5. Still further, in the ceiling side of the duct upper side section 1A there is fitted a cover section (not shown) having a hot wire 9 and others thereon.

According to the fourth embodiment, using a resin or the like, the duct portions 1A, 1B and the vortex generator 2 have integrally formed therein various passages and openings including a portion of the detection passages 5, the space sections 14 and 15 between the detection passage 5 and the inflow opening 3 and between the detection passage 5 and the outflow opening 4, the curved surfaces between the detection passage 5 and the space section 14 and between the detection passage 5 and the space section 15, and the projection 16 on the upstream side of the inflow opening 3. Therefore, the components constituting the vortex generator 2 and the detection passages 5 and the projection 16 can be manufactured with a high accuracy in relative position, and the number of parts is reduced and the assembling and the maintenance are facilitated.

Fifth Embodiment

Figure 10:
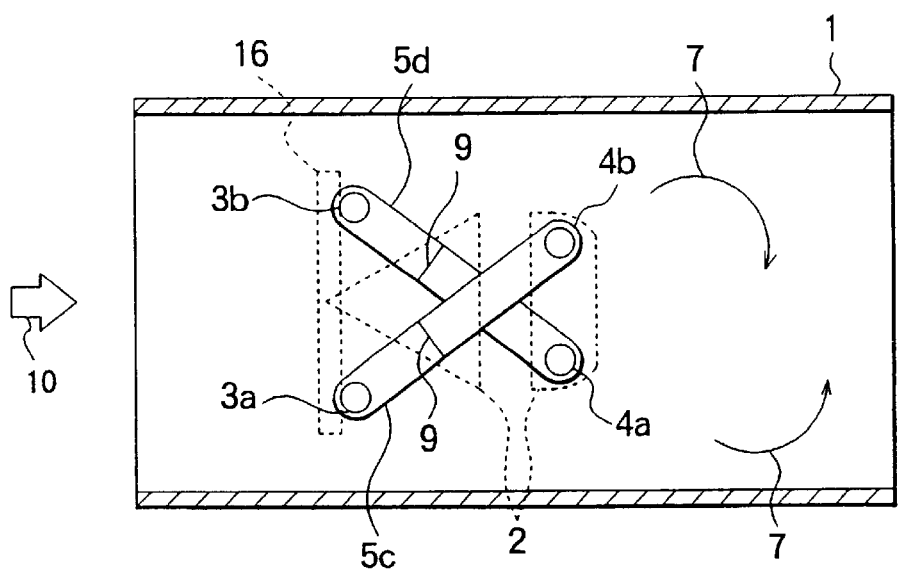
FIG. 10 is a plan view showing a Karman vortex flow meter according to a fifth embodiment of this invention.
Figure 11:
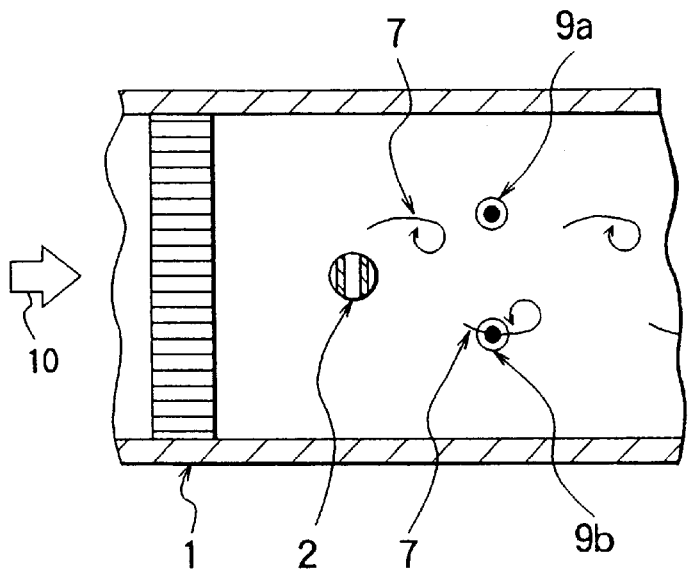
FIG. 11 is an illustration of a prior Karman vortex flow meter.
Figure 12:
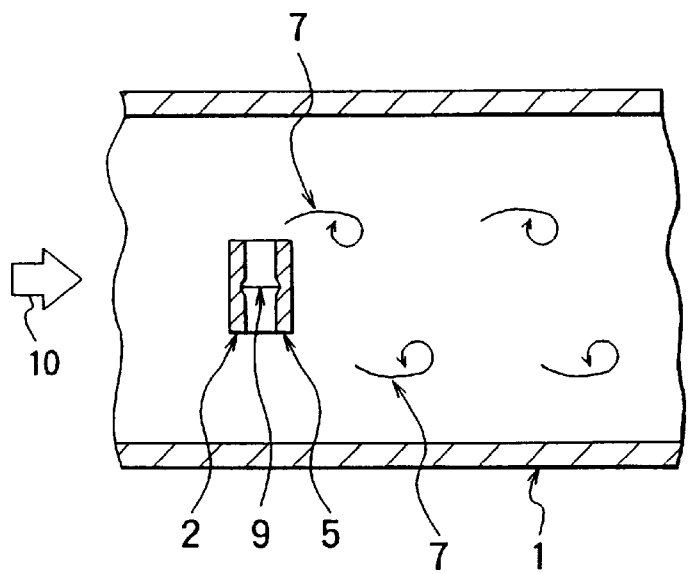
FIG. 12 is an illustration of a prior Karman vortex flow meter.
Figure 13:
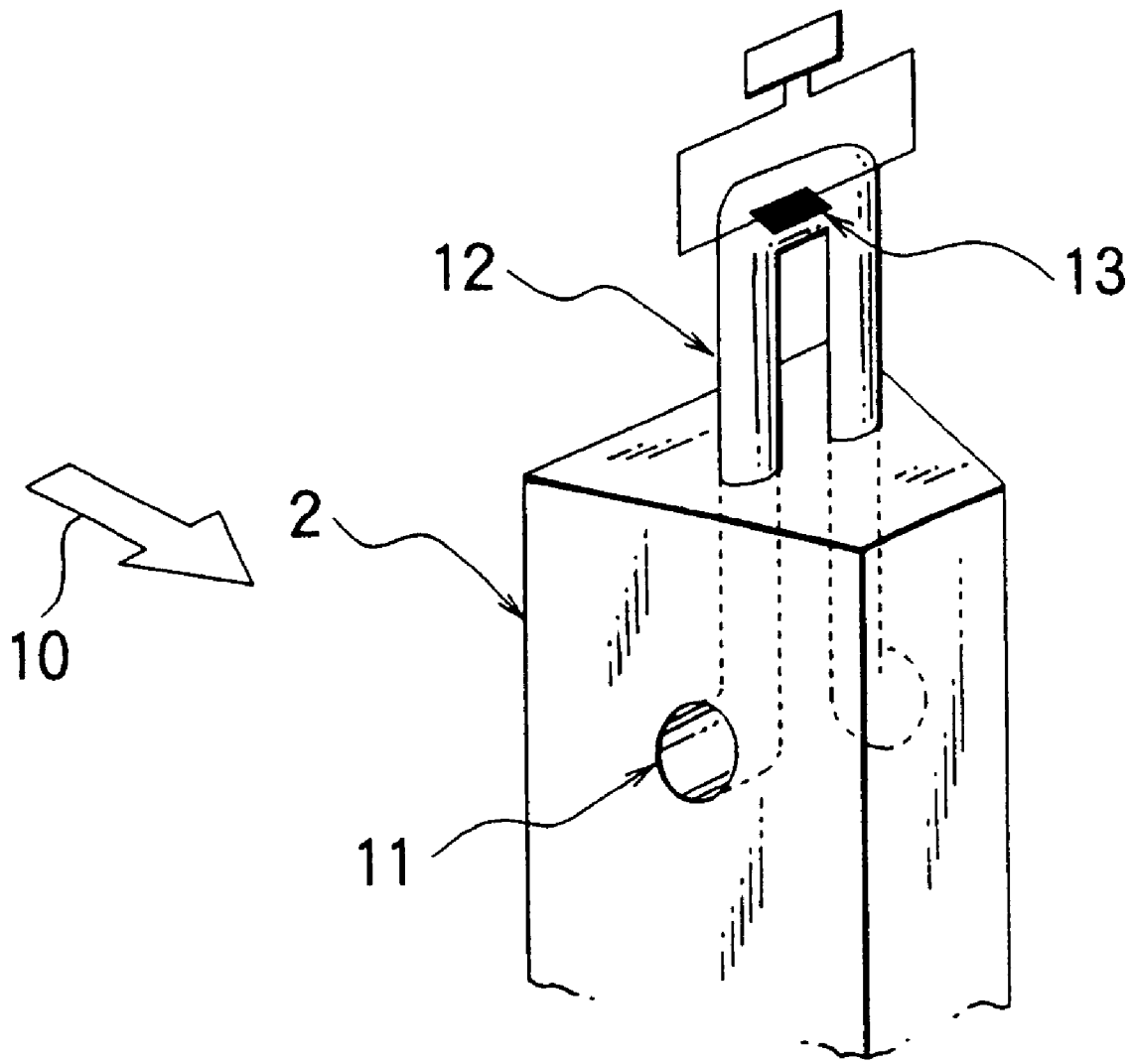
FIG. 13 is an illustration of a prior Karman vortex flow meter.

While, in the flow meters according to the above embodiments, the detection passage 5 is disposed substantially along and in parallel to the duct flow path, it is also appropriate that, as shown in FIG. 10, a detection passage 5c is provided between the inflow opening 3a and the outflow opening 4b in FIG. 2 and a detection passage 5d is placed between the inflow opening 3b and the outflow opening 4a in FIG. 2 and further the two detection passages 5c, 5d are spatially crossed but not meeting with each other.

With this structure, when the pressure distribution state is taken as shown in FIG. 3, the flow velocity within the detection passage 5c depends upon the difference between the pressure (almost equal to G) in the inflow opening 3a and the pressure (almost equal to G) in the outflow opening 4b, and the flow velocity within the detection passage 5d depends on the difference between the pressure (close to H) in the inflow opening 3b and the pressure (close to B) in the outflow opening 4a. Accordingly, the detection sensitivity is expressed as [(H–B)–(G–G)], which is higher than that of the first embodiment.

Furthermore, while the above-described embodiments have the two detection passages 5, the same effects are obtainable even if only one detection passage is provided. That is, any one of the detection passages 5a, 5b in FIG. 2 or any one of the detection passages 5c, 5d in FIG. 10 can be used as the detection passage.

In addition, although in the above-described embodiments the vortex generator 2 assumes a combination of a column with a trapezoidal cross section and a column with a triangular cross section, the shape thereof is not limited thereto as long as it can produce the Karman vortexes. Further, although the hot wire 9 is used as a means to detect the flow velocity within the detection passage, a another flow velocity detecting sensor is also available, which can produce the same effects.

As described above, in accordance with one aspect of the present invention, although the fine irregular disturbance occurs in the flow entering the detection passage due to the separation or the like on a wall surface, an enlarged space section is provided in a detection passage to reduce the disturbance of the fluid coming into the inflow opening of the detection passage and the pulsation components coming from the outflow opening.

Further, since the passage cross-sectional area of the space section enlarges, the frictional resistance within the detection passage decreases so that the flow velocity becomes faster at the detection section, which can produce the effects to increase the detection signal output of the detection section.

Furthermore, the cross section area of the detection passage communicating with the detection section is made to smoothly vary, thus rectifying the fluid flowing through the detection passage. In addition, a projection is installed on the upstream side of the inflow opening of the detection passage, so that the entrance resistance in the inflow opening is reduced, with the result that the flow velocity in the detection section increases to enhance the signal output of the detection section.

Moreover, the projection has a circular arc cross section in at least its downstream side, and hence the fluid passing through the duct is pulled upwardly toward the inflow opening side, so that the fluid can easily enter the inflow opening.

Still further, the upstream side of the projection is made to have a tangential surface to the circular arc intersecting the duct wall surface, with the result that the flow becomes smooth to prevent the accumulation of dust on the projection.

Moreover, when a generation source for producing the pulsation in the fluid under measurement is provided in the downstream side of the Karman vortex flow meter, the measurement is affected by the pulsation from the downstream side, but the opening area of the outflow opening of the detection passage is set to be less than twice the cross-sectional area of the detection passage in which the detection section is placed, with the result that the pulsation components coming from the outflow opening are suppressible.

Further, the duct portions and the vortex generator have integrally formed therein various passages and openings such as a portion of the detection passages, the space sections between the detection passage and the inflow opening and between the detection passage and the outflow opening, the smoothly cross-sectional area varying sections between the detection passage and the space sections and the projection on the upstream side of the outflow opening. Therefore, the components organizing the vortex generator and the detection passages and the projection can be manufactured with a high accuracy in relative position, and the number of parts is reduced and the assembling and the maintenance are facilitated.

Besides, through the use of a hot wire in the detection section, a large electric signal is obtainable, thus improving the accuracy.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A Karman vortex flow meter including a duct in which a fluid flows, and a vortex generator in the duct, said flow meter detecting a period of Karman vortexes generated by the vortex generator in order to measure a flow velocity or flow rate of the fluid, said flow meter comprising:

a detection passage communicating with the duct and having an outflow opening in an end surface of the vortex generator and an inflow opening on an upstream side of said outflow opening; and a detection section disposed in said detection passage to detect variation of a flow velocity of the fluid within said detection passage which occurs due to a negative pressure of the Karman vortexes, wherein said outflow opening is placed at or adjacent to a separation point of the Karman vortexes and at a position separated from a boundary layer on a wall surface of said duct, and an opening area of said outflow opening is less than twice a passage cross-sectional area of said detection section.

2. A Karman vortex flow meter as defined in claim 1, wherein a portion of said detection passage, said vortex generator and said inflow opening and said outflow opening of said detection passage are integrally molded as a one-piece construction.

3. A Karman vortex flow meter as defined in claim 1, wherein a hot wire is provided for detecting the flow velocity within said detection passage and variation of the flow velocity is measured by variation of a current in said hot wire.

* * * * *